United States Patent
Maloney

(10) Patent No.: US 6,262,664 B1
(45) Date of Patent: Jul. 17, 2001

(54) TAMPER DETECTION PREVENTION FOR AN OBJECT CONTROL AND TRACKING SYSTEM

(75) Inventor: William C. Maloney, Marietta, GA (US)

(73) Assignee: Key-Trak, Inc., Duluth, GA (US)

( * ) Notice: Subject to any disclaimer, the term of this patent is extended or adjusted under 35 U.S.C. 154(b) by 0 days.

(21) Appl. No.: 09/393,115

(22) Filed: Sep. 10, 1999

Related U.S. Application Data

(60) Provisional application No. 60/099,954, filed on Sep. 11, 1998.

(51) Int. Cl.⁷ ................................................. G08B 13/14
(52) U.S. Cl. ..................................... 340/572.8; 340/568.2; 340/572.9
(58) Field of Search ............................. 340/568.1, 568.2, 340/568.7, 571, 572.1, 572.8, 572.9; 70/DIG. 46, 395, 456 R; 40/330, 600

(56) References Cited

U.S. PATENT DOCUMENTS

| | | | |
|---|---|---|---|
| 3,451,043 | 6/1969 | Krause | 235/385 |
| 4,209,787 | 6/1980 | Freeny, Jr. | 342/457 |
| 4,275,385 | 6/1981 | White | 340/825.49 |
| 4,419,734 | 12/1983 | Wolfson et al. | 702/129 |
| 4,519,522 | 5/1985 | McElwee | 221/13 |
| 4,549,170 | 10/1985 | Serres et al. | 340/568.1 |
| 4,575,719 | 3/1986 | Bertagana et al. | 340/825.35 |
| 4,595,922 | 6/1986 | Cobb et al. | 340/825.49 |
| 4,635,053 | 1/1987 | Banks et al. | 340/825.31 |
| 4,636,950 | 1/1987 | Caswell et al. | 705/28 |
| 4,658,357 | 4/1987 | Carroll et al. | 705/32 |
| 4,673,915 | 6/1987 | Cobb | 340/330 |
| 4,737,910 | 4/1988 | Kimbrow | 705/28 |
| 4,796,209 | 1/1989 | Burk | 700/302 |
| 4,814,592 | 3/1989 | Bradt et al. | 235/381 |
| 4,827,395 | 5/1989 | Anders et al. | 700/9 |
| 4,845,492 | 7/1989 | Cobb et al. | 340/825.49 |
| 4,853,692 | 8/1989 | Wolk et al. | 340/573.1 |
| 4,866,661 | 9/1989 | dePrins | 235/382 |
| 4,889,977 | 12/1989 | Haydon | 235/375 |
| 4,926,161 | 5/1990 | Cupp | 340/988 |
| 5,021,778 | 6/1991 | Walton | 340/10.34 |
| 5,038,023 | 8/1991 | Saliga | 235/385 |
| 5,062,151 | 10/1991 | Shipley | 359/154 |
| 5,099,227 | * 3/1992 | Geizler et al. | 340/572.5 |
| 5,182,570 | 1/1993 | Nysen et al. | 343/795 |
| 5,218,344 | 6/1993 | Ricketts | 340/573.4 |
| 5,287,414 | 2/1994 | Foster | 382/100 |
| 5,319,544 | 6/1994 | Schmerer et al. | 705/28 |
| 5,335,170 | 8/1994 | Petteruti et al. | 705/28 |

(List continued on next page.)

FOREIGN PATENT DOCUMENTS

| | | |
|---|---|---|
| WO9504324 | 2/1993 | (WO). |
| WO9512858 | 5/1995 | (WO). |

\* cited by examiner

Primary Examiner—Van T. Trieu
(74) Attorney, Agent, or Firm—Womble Carlyle Sandridge & Rice

(57) ABSTRACT

Tamper detection and prevention for an object control and tracking system and particularly a Key Track system is provided. Where objects being tracked are keys, a key card having a touch memory device, RF id tag, or other circuitry for storing and transmitting an ID to a controller is provided. A tether attaches a key to the card. In one embodiment, the tether is conductive and the transmission of the ID code passes through the tether. If the tether is cut, transmission is interrupted to indicate a tampering condition. In another embodiment, the tether is resistive and circuitry is provided to monitor a voltage drop across the tether. A change in the voltage drop indicates a tampering condition. An object of the invention is to detect an attempt to remove the key (or other object) from its ID card while leaving the card intact.

7 Claims, 6 Drawing Sheets

U.S. PATENT DOCUMENTS

| | | | |
|---|---|---|---|
| 5,374,815 | 12/1994 | Waterhouse et al. | 235/383 |
| 5,402,104 | 3/1995 | LaRosa | 340/539 |
| 5,404,384 | 4/1995 | Colburn et al. | 377/6 |
| 5,426,284 | 6/1995 | Doyle | 705/28 |
| 5,521,815 | 5/1996 | Rose, Jr. | 705/28 |
| 5,528,222 | 6/1996 | Moskowitz et al. | 340/572.7 |
| 5,533,079 | 7/1996 | Colburn et al. | 377/6 |
| 5,627,520 | 5/1997 | Grubbs et al. | 340/572.1 |
| 5,671,362 | 9/1997 | Cowe et al. | 705/28 |
| 5,689,238 | 11/1997 | Cannon, Jr. et al. | 340/572.1 |
| 5,777,884 | 7/1998 | Belka et al. | 700/225 |
| 5,801,628 | 9/1998 | Maloney | 340/568.2 |

TAMPER DETECTION PREVENTION FOR AN OBJECT CONTROL AND TRACKING SYSTEM

REFERENCE TO RELATED APPLICATIONS

This application claims the benefit of the filing date of prior filed U. S. Provisional Patent Application Ser. No. 60/099,954, filed Sep. 11, 1998.

TECHNICAL FIELD

This invention relates generally to object tracking and control systems and more particularly to systems for tracking and controlling access to and disposition of objects such as keys and to enhancements usable with such systems to detect and prevent tampering with or attempts to defeat the systems.

BACKGROUND

Many objects have intrinsic value or have value because they provide access to other valuable objects. For instance, jewelry and coins have inherent intrinsic value while keys, such as keys to vehicles, have value because they provide access to other valuable objects, namely automobiles and trucks. Further, access to and control of some items, such as narcotics for example, needs to be monitored, tracked, and controlled to assure against unauthorized access or assure that proper and appropriate accesses is catalogued. There is a serious need to be able to track, catalogue access to, and control such objects in a way that is reliable, simple to implement, and virtually tamper proof.

In the past, a variety of systems have been implemented to track and control objects. In the case of keys in an automobile dealership, for example, pegboards have been used to keep track of the keys as sales persons, maintenance personnel, and others remove keys for access to vehicles. Generally, sign out sheets are used to log the check-in and checkout of such keys. Obviously, such a manual system of tracking has numerous shortcomings due in large part to the very real potential of human error and forgetfulness in carrying out the sign-in and sign-out procedures.

More recently, automated computer controlled key tracking systems have been implemented for tracking, for example, vehicle keys at car lots and keys to the apartments of apartment complexes. One such system particularly applicable to the present invention is the key tracking system disclosed and claimed in my U.S. Pat. No. 5,801,628, the disclosure of which is hereby incorporated fully by reference. In the disclosed system, referred to herein as the "Key Track" system, keys to a vehicle are attached with a rivet, tether, or the like to a thin plastic key tag or card having a depending tongue. The tongue carries a small button shaped electronic touch memory device, which electronically stores an ID code. The tongue of each key card is configured to be insertable in any of an array of slots formed in a top panel within a storage drawer. A printed circuit backplane is disposed beneath the top panel and is provided with a plurality of pairs of metal contacts, each pair of contacts being aligned with a corresponding one of the slots in the top panel. When the tongue of a key card is inserted in a selected one of the slots, its touch memory device is engaged by the corresponding pair of contacts.

A computer or microprocessor or microcontroller based controller is electronically coupled through a communications matrix to the contacts on the backplane and periodically polls each pair of contacts, preferably several times per second, to determine the presence or absence of a touch memory device and thus which slots contain key cards and which do not. More specifically, if no information is received from a particular pair of contacts when polled, it is determined that the slot corresponding to the pair of contacts is empty. When a slot contains a key card, the touch memory device of the card responds to the poll by transmitting its ID code, from which the identity of the particular key attached to the card can be determined through a table lookup. In this way, the absence or presence and location in the storage drawer of key cards and their associated keys can be noted by the controller each time the array of contacts are polled. If a card present in a slot on a prior polling is absent on a subsequent polling, then the controller notes that the card and its key have been removed from the storage drawer. Conversely, if a key card is detected in a previously empty slot, the controller notes that the card and its key have been replaced in the storage drawer. The removal and replacement of keys is therefore continuously monitored.

An access feature requires an authorized user such as a sales person to enter an ID code to unlock and access the storage drawer. When the history of removal and replacement of key cards and their keys is combined with other information, such as the time at which cards are removed and replaced and the identities of the persons who accessed the drawer and times of access, access to the keys in the drawer can be controlled and a detailed tracking log can be created. This Key Track system greatly decreases instances of lost keys, reduces the time required to find checked-out keys, and generally provides automatic tracking and control of the keys, and thus, to a large extent, controls and tracks the vehicles to which the keys provide access.

As an alternative to a Key Track system using touch memory devices requiring physical engagement with conducting contacts, non-contact transmission of ID codes to the controller are also possible. Such systems make use of radio frequency (RF) tags on the key cards with the tags having an integrated circuit chip storing the ID code and perhaps other information and an antenna attached to the chip. The antenna can be a capacitive plate antenna, an inductive loop antenna, a dipole antenna, or another type of antenna. The backplane of the system includes an array of sensors in the form of antennas that are positioned to align with the antennae on the key cards when the cards are inserted within their slots or receptacles in the storage unit. Information is transmitted from the cards to the controller via radio frequency transmission or modulation from the antennas on the key cards to the sensor antennas on the backplane. Aside from the non-contact method of data transmission, the functionality of such systems is much the same as a system using touch memory devices.

While the Key Track system described above has proven extremely valuable in the tracking and control of keys, it nevertheless has certain problems and shortcomings inherent in its design. One such problem is the potential for tampering and system defeat simply by cutting the key card or cutting the key in order to remove the key from the card without removing the card from the Key Track storage drawer. In such an event, the key card remains in its slot so the Key Track controller fails to note any suspicious activity, thinking instead that the key is still secure within the storage drawer. Even though a subsequent user of the system my notice that the key has been removed from its card, this may not occur for some time and, by then, the key (or other valuable object that may have been attached to the card) may well be beyond recovery. Further, relying on humans to report system compromises allows for the potential for conspiracy, and is thus generally not reliable.

Thus, a need exists for a method and system for detecting tampering and attempted defeat of a Key Track system by removing a key or other valuable item from its Key Track card while leaving the card intact within the Key Track storage drawer. In a broader sense, the system should be adaptable for use with Key Track systems utilizing touch memory devices and non-contact RF tag devices for storing and transmitting ID codes to the system controller. The system should be reliable, should indicate tampering with a high level of confidence when it occurs, and should operate autonomously without the need for relying on human intervention for detecting and reporting tampering. It is to the provision of such a method and system that the present invention is primarily directed.

SUMMARY OF THE INVENTION

Briefly described, the present invention, in one preferred embodiment thereof, comprises a method and apparatus for detecting tampering with a Key Track system through attempted removal of a tracked object from its ID card. In the preferred embodiment, the object is a key, but may also be other types of objects trackable with a Key Track system as detailed below. In its broadest sense, the apparatus comprises a tether made of a conducting or resistive material and attaching the key to its key card. The tether forms a conducting or resistive loop through which a current can flow when the tether is intact. In one embodiment, the touch memory device or RF tag communicates to the system controller directly through the tether loop. In another, the current flowing through the tether and consequent voltage drop across the tether is monitored by a microcontroller fixed to the ID card.

In the case of a tether loop through which the ID device communicates directly, if the tether loop is cut to remove the key, or of the card is cut, the ID device ceases to communicate with the controller. The controller logs this as the key card having been removed from the system. Since the user who tampered with the system entered his or her authorization code to access the drawer, the perpetrator will be isolated and identified at a later time when the missing key is noticed. Thus, tampering is detectable and, consequently, deterred by the system.

In an alternate and more robust embodiment of the invention, the tether contains a resistive core and a microcontroller on the key card constantly monitors a voltage drop across the tether. If the resistance changes because the tether is cut, shunted, or damaged, the microcontroller notes the event and can report a suspicious condition immediately to the central controller. The controller can then issue appropriate alarms and alert security personnel. This embodiment is an improvement over the simple conducting tether because it eliminates the delay between the tampering and its detection and also eliminates the need for a human to notice the missing key.

The invention also includes stainless or hardened key shrouds for preventing a would be thief from cutting a key directly to remove it from its tether while leaving the tether intact. A further implementation of the invention comprises a bag for containing an object to be tracked. The bag is formed with a conductive or resistive mesh, preferably embedded within the material of the bag. The mesh is defined by a strand of material that is formed into the crisscrossing pattern of the mesh and has two ends. The bag is closed and sealed by a hinged seal, which carries a touch memory or other ID device and that has contacts that engage the two ends of the mesh strand. The seal is insertable in a receptacle of a Key Track system in the usual way. If the bag is cut, the continuity of the mesh is destroyed and this event is detected and conveyed to the central controller for alarm generation. Thus, the object in the bag is secured against being cut from the bag and taken from the Key Track system. Other variations of the invention are also envisioned, as described in more detail below.

Thus, an apparatus and method is now provided that successfully addresses a vulnerability of the basic Key Track system by effectively and reliably detecting and preventing attempts to defeat the system by cutting a key or other object from its key card. In some embodiments, the invention is readily usable with the basic existing Key Track system. In other embodiments, tampering is detected immediately and appropriate alarms are sounded. These and other features, objects, and advantages of the invention will become apparent upon review of the detailed description set forth below when taken in conjunction with the accompanying drawings, which are briefly described as follows.

DETAILED DESCRIPTION OF THE PREFERRED EMBODIMENTS

Figure 1:
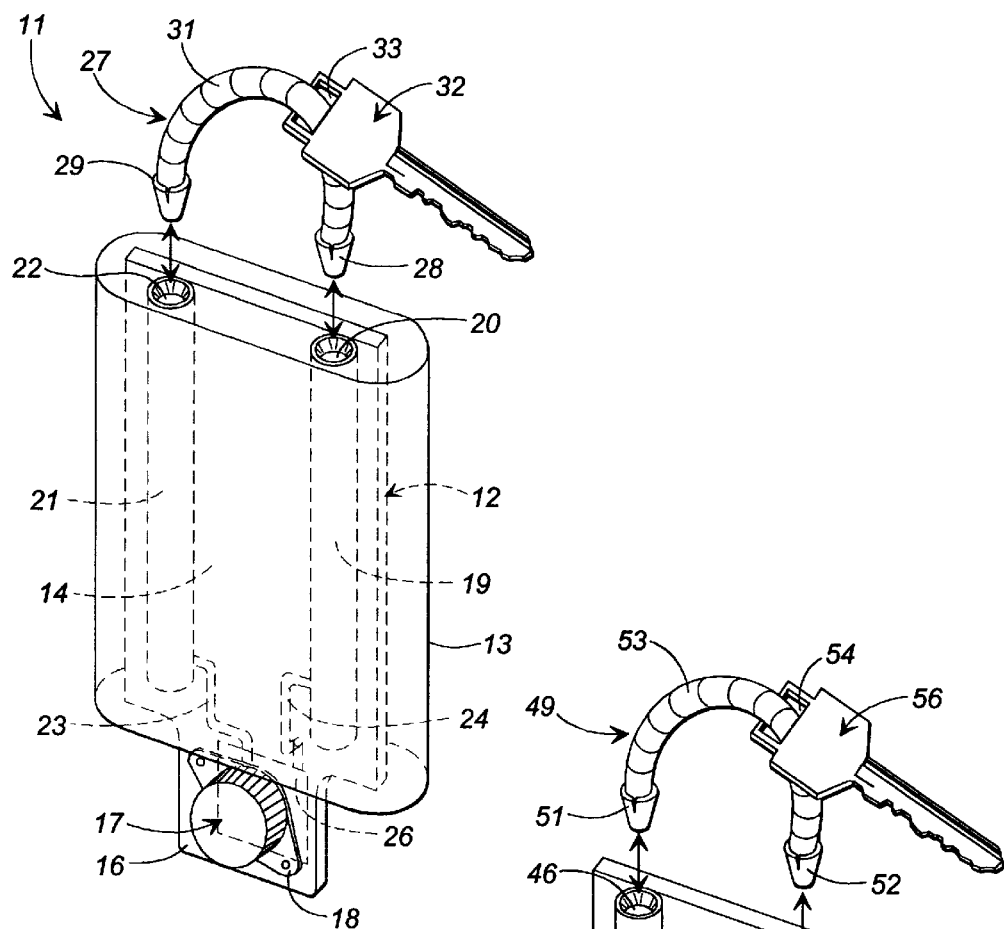
FIG. 1 is a perspective partially exploded view of an apparatus for tamper detection and prevention in a Key Track system that embodies principles of the invention in a preferred form.

Referring now in more detail to the drawings, in which like numerals refer to like parts throughout the several views, FIG. 1 illustrates a key tag assembly that embodies principles of the invention in a preferred form and that is adapted for use with an existing Key Track system. The key tag assembly 11 comprises a key card 12 formed with a main body 14 and a depending tongue 16. The key card is encased in a sheath or protective casing 13 to enclose and protect internal components of the assembly. The key card 12 can be made of a variety of materials such as, for example, printed circuit board material, plastics with or without embedded components, or other appropriate material.

A touch memory device 17 is mounted to the tongue 16 of the key card and is securely held on one side thereof by a retainer 18. Unlike the traditional Key Track system, the touch memory device is not mounted through a hole in the tongue and therefore the device is exposed only on one side of the tongue rather that being exposed on both sides. A first tether retaining tube 19 made of electrically conducting material is secured to the key card extending along the length thereof and a second tether retaining tube 21 also made of electrically conducting material is secured to the card spaced from and generally parallel to the first tube 19. The first tether retaining tube has an open top end 20 and a closed bottom end (not visible) and the second tether retaining tube has an open top end 22 and a closed bottom end (not visible). The bottom ends of the tether retaining tubes may also be open if desired and the open top ends of the tubes are exposed on the top of the tag assembly. Further, instead of being formed of an electrically conducting material, the tubes 19 and 21 may be made of insulating material or maybe provided with an internal or external conductor extending therealong.

A conductive contact pad 26 is formed on the side of the depending tongue opposite the side on which the touch memory device is mounted and preferably is formed by printed circuit etching techniques. A printed circuit trace 24 electrically connects the contact pad 26 to the first tether retaining tube 19. A printed circuit board trace 23 electrically connects the second tether retaining tube to one of the contact surfaces of the touch memory device, which is the contact surface that normally is exposed on the back side of the depending tongue 16 in a traditional Key Track key card. The other contact surface of the touch memory device is exposed just as it is in the traditional tag.

An electrically conducting tether 27 has a first locking end 28 and a second locking end 29 connected by a tether loop 31. The locking ends 28 and 29 preferably are spring biased as illustrated so that they can be pressed together but, when released, spring back out to their expanded configurations. The open ends 20 and 22 of the tether retaining tubes are formed with interior lips or rims that form catches for the locking ends of the tether. With this configuration, the locking ends of the tether may be inserted into the open ends of the tether retaining tubes, where they snap securely into place to lock the ends of the tether in the ends of the tether retaining tubes. When the tether loop 31 is extended through the opening 33 of a key 32 prior to its ends being pressed into the tether retaining tubes, it will be seen that the key is securely tethered to the assembly. Further, since the tether is conducting, locking of the tether in the tether retaining tubes forms a closed electric circuit between the contact pad 26 on the back of the depending tongue 16 and the corresponding contact surface of the touch memory device 17. Obviously, the tether is covered by an insulating jacket to protect the tether loop against electrical contact with the key. The tether retaining tubes preferably are tubular and hollow inside. In this way, the tag assembly can be reused many times with different keys simply by clipping off the locking ends 28 and 29 of a used tether, allowing them to fall into the tether retaining tubes, and locking a new tether in place.

With a key tethered to the assembly of FIG. 1, the assembly can be inserted into a slot of a Key Track system in the usual way. However, the touch memory device of this enhanced tag assembly can only communicate with the Key Track controller when the tether is connected to the tether retaining tubes completing the electrical path between the contact pad 26 and the hidden contact surface of the touch memory device. Thus, as long as the key is tethered to the assembly, it functions in the usual way with the Key Track system. However, if the tether is cut while the tag is inserted in a slot of the Key Track system in an attempt to defeat the system and steal the key, the system will loose communication with the touch memory device on that tag. When this occurs, the Key Track controller will note erroneously that the current authorized user (the user who entered an approved code to access the Key Track drawer in the first place) has checked out the tag. Accordingly, when a subsequent user or management notices that the key has been cut off of the card, the person logged by the controller as having checked out the key is the obvious and isolated suspect. In some systems, a user may only be authorized to remove certain specified keys from the entire set of keys in the Key Track unit. If this user accesses the system and then clips or cuts of a key he does not have authority to access, the system immediately notes an improper access and can sound an alarm. Not only will the perpetrator be identified, but the general knowledge that such identifications will be made substantially deters attempts to tamper with or defeat the system.

Figure 2:
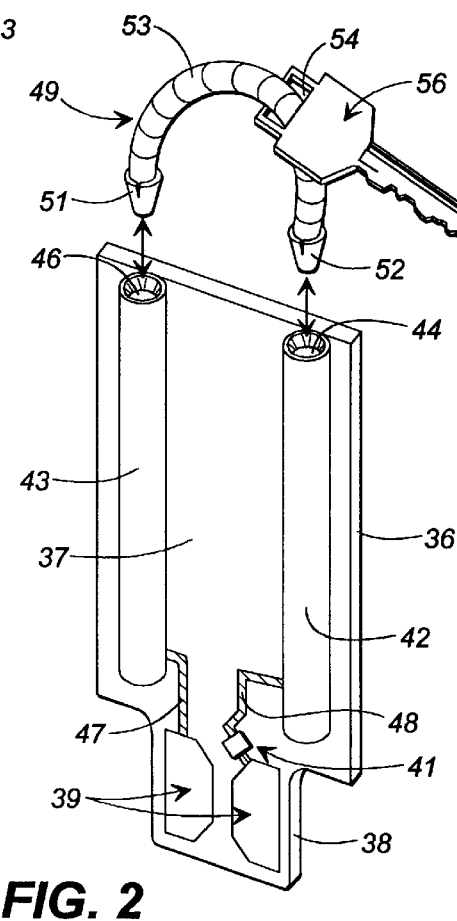
FIG. 2 is a perspective partially exploded view of an alternate embodiment of a tamper detection and prevention apparatus for a Key Track system.

FIG. 2 illustrates an alternate embodiment of a tamper determining key tag assembly. This embodiment is similar in many respects to that of FIG. 1, but is usable with a Key Track system wherein ID codes are stored in a radio frequency identification tag (RF tag) and transmitted to the Key Track system via RF transmission. As with the embodiment of FIG. 1, the tag assembly comprises a card 36 having a main body 37 and a depending tongue 38. A pair of tether retaining tubes 42 and 43 are fixed to the card 36 and a conducting tether 49 has locking ends 51 and 52 adapted to be pressed and locked into the open ends 44 and 46 of the retaining tubes. The tether loop 53, which extends between the ends, extends through the opening 54 of a key 56 for securing the key to the tag assembly.

In this embodiment, an RF antenna comprising a pair of capacitive plates 39 is formed on the depending tongue 38 of the card 36. The integrated circuit chip 41 of the RF tag is connected by a trace on the board directly to one of the capacitive plates 39 of the capacitive antenna and to the other capacitive plate through the circuit formed by the tether retaining tubes and the tether. Thus, as long as the tether is intact, the key tag assembly functions normally by transmitting the code of the RF tag to the controller via the capacitive plate antenna when the tag is located in a slot of a Key Track storage container. However, if the tether is cut without removing the tag from the storage drawer, the controller looses communication with the tag and notes that the current user checked it out. Subsequently, as with the embodiment of FIG. 1, the user and thief can be identified through a review of the check out logs of the controller.

Figure 3:
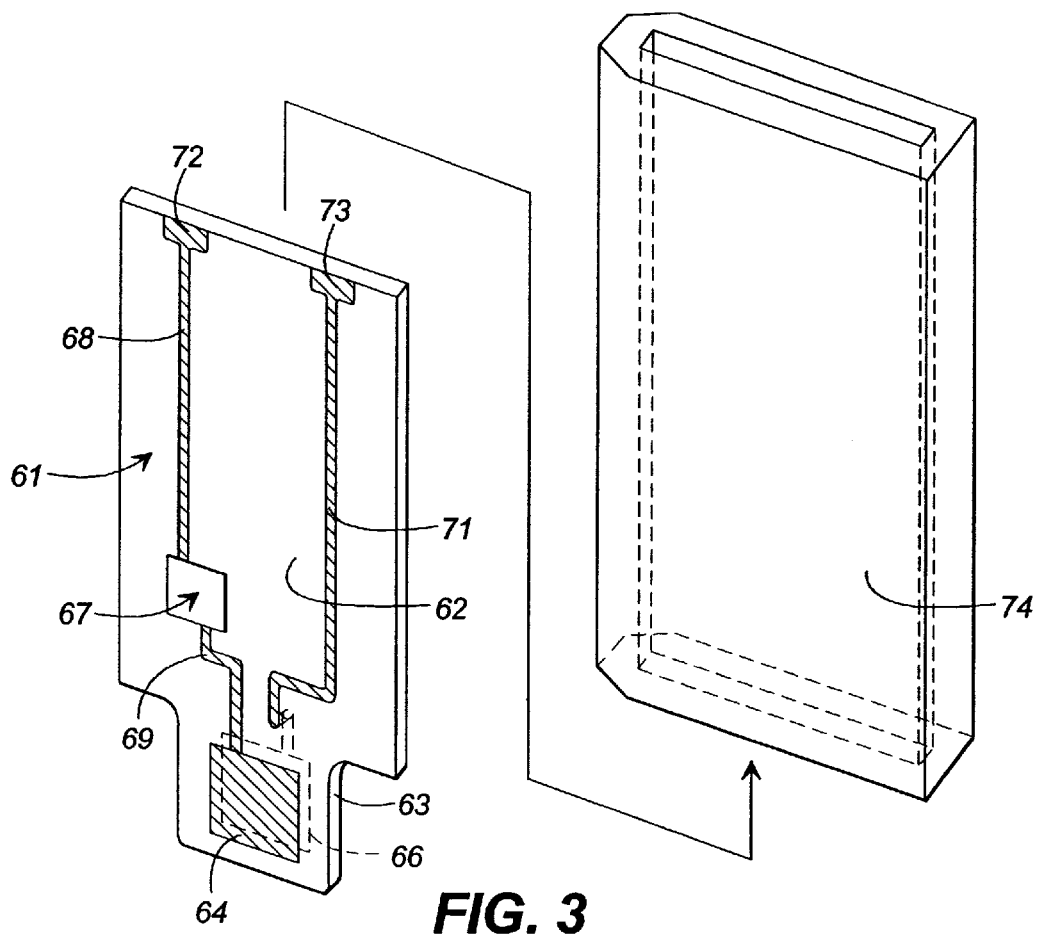
FIG. 3 is a perspective partially exploded view of yet another embodiment of an apparatus for tamper detection and prevention in a Key Track system.
Figure 4:
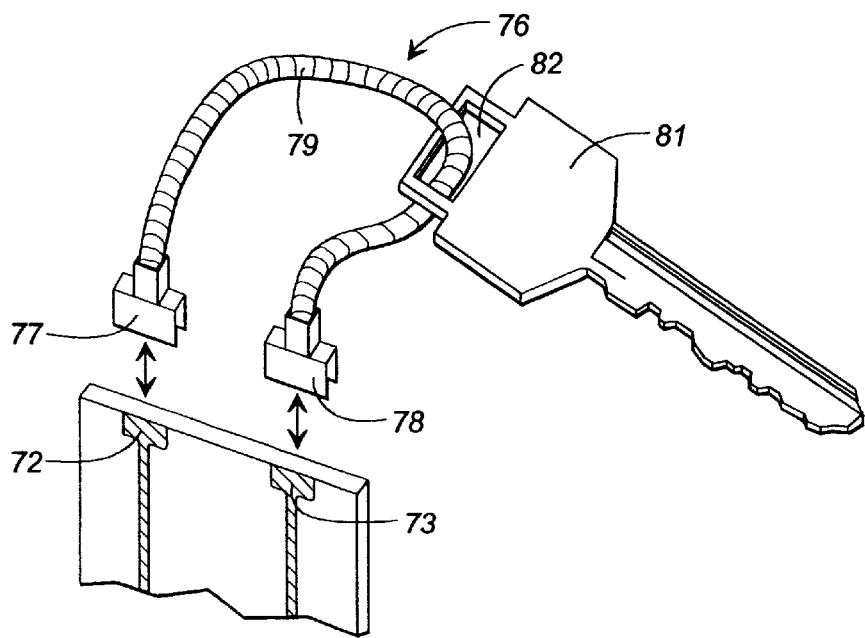
FIG. 4 is a perspective view illustrating attachment of a key tether and key to the embodiment of FIG. 3.

FIGS. 3 and 4 illustrate yet another embodiment of the tamper determining key tag assembly of this invention. In this embodiment, a key card 61, formed of printed circuit board or other appropriate material, has a main body 62 and a depending tongue 63. The card carries an RF tag, which includes an integrated circuit chip 67 and a pair of capacitive plate antennas 64 and 66 disposed on the depending tongue of the card. Conducting traces 68 and 71 are formed on the card and define a part of an electrical circuit connecting the capacitive plates of the antenna to the integrated circuit chip. Each trace 68 and 71 terminates at the top of the card in a corresponding one of the contact pads 72 and 73. A conducting tether 76 (FIG. 4) has generally U-shaped spring biased clip ends 77 and 78 connected by a tether loop 79, which is extendable through the opening 82 of a key 81. The clip ends 77 and 78 are adapted to be clipped over respective ones of the contact pads 72 and 73 to tether the key securely to the card. The clipping of the clips to the contact pads also completes the circuit between the capacitive plates of the antenna and the RF tag chip 67. A protective sheath 74 can be slid over the card to cover and protect the card and the locking clips.

It will be seen that the embodiment of FIGS. 3 and 4 functions in substantially the same way as the embodiment of FIG. 2 in an RF Key Track system.

Figure 5:
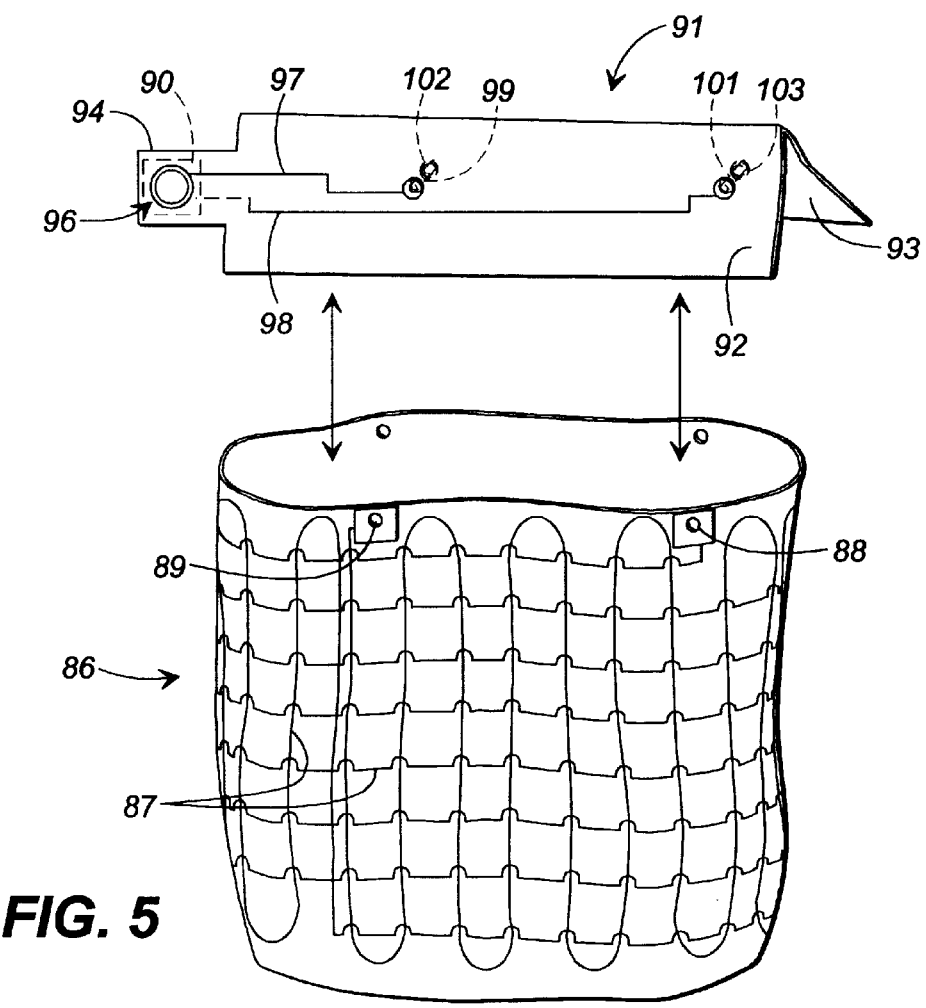
FIG. 5 is a perspective view illustrating yet another embodiment of the apparatus of this invention for detecting tampering with a tracked object stored in a bag.

FIG. 5 illustrates an alternate embodiment of the invention for use in securing loose objects other than keys, such as, for example, jewelry, in a Key Track system and for detecting attempts to defeat or tamper with the system by cutting or destroying the bag. In this embodiment, a bag 86 is provided for receiving and containing an object or objects to be tracked. The bag 86, which may be made of any suitable material such as cloth, nylon, or the like, is provided with strands 87 of conducting material that are configured to form a grid or mesh that encases the bag. In the preferred embodiment, the bag has a multi-layered structure and each tier of the grid is formed on a respective layer of the bag. The mesh can also be attached to the bag in any other suitable way such as, for example, being sewn into the lining of the bag. The conductive strands 87 in each layer of the bag that together form the mesh terminate in contact pads 88 and 89 at the open top portion of their respective layers of the bag. If desired, the entire outer surface of the bag can be provided with a conductive outer layer for further protection.

A hinged clip 91, which may be made of plastic or other suitable material, is provided for sealing the top of the bag and thus closing an object in the bag. The hinged clip 91 has a fista side 92, a second side 93, and one of the sides is formed with a projecting tongue 94 adapted to be inserted into a slot of a Key Track system. The tongue is provided with a touch memory device for transmitting an identifying code to the controller of the Key Track system in the traditional way when the tongue is inserted into a slot. An RF tag may alternatively be used instead of a touch memory device.

A first locking pin 99 projects from one of the sides of the clip toward the other side, which is formed with a locking hole 102 aligned with the locking pin. The locking hole is sized such that when the locking pin is pressed through the hole, the pin is locked securely in place within the hole. Similarly, a second locking pin 101 extends from the one side toward an aligned locking hole 103 formed in the other side. One contact surface of the touch memory device 96 is electrically connected to locking pin 99 by a conducting trace 97. The other locking pin is electrically connected to a contact pad 90 formed on the back of the projecting tongue 94. The locking pins are made of a conducting material such as metal.

In use, an object to be secured and tracked is placed in the bag 86. The locking clip 91 is then placed over the open end of the bag and positioned such that when the locking clip is squeezed shut, each of its locking pins pierce, extend through, and make electrical contact with a respective one of the contact pads 88 and 89 that terminate the conductive strand of the mesh. Thus, a closed conducting circuit is formed from one of the contact surfaces of the touch memory device, through the mesh, and to the contact pad on the back of the tongue. The tongue can then be inserted in a slot of a Key Track system, where the code of the touch memory device is read in the usual way.

When the bag is closed with the clip, the locking pins of the clip lock into place within their respective locking holes to seal the bag securely. Preferably, the clip can only be unlocked to retrieve the contents of the bag by authorized personnel using a special unlocking tool. If a would be thief attempts to cut the bag and remove the object inside with the tag intact within a Key Track receptacle, the connection between the touch memory device and the system controller will be broken because the mesh strand will be severed. In this event, the Key Track controller will note in its log that the bag has been removed by the person who accessed the system with his or her authorization code. When it is later discovered that the bag has been compromised, a review of the access log will reveal the thief, as with previously discussed embodiments. Alternatively, if a user with access to the system but without authority to access a particular bag cuts or tampers with the bag, this event is detected and alarm generated immediately.

Figure 6:
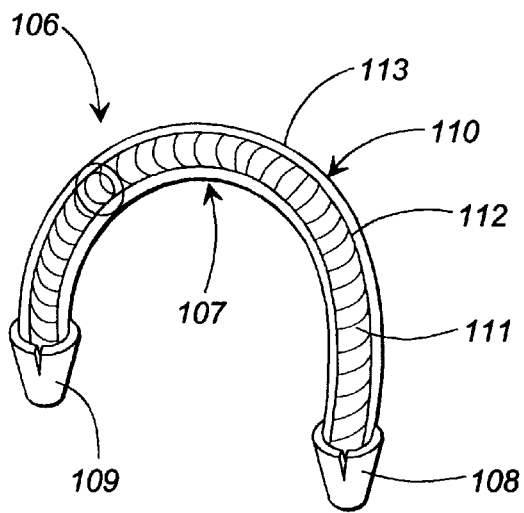
FIG. 6 is a perspective view of a resistive tether for use with the tamper detection and prevention apparatus of this invention.
Figure 7:
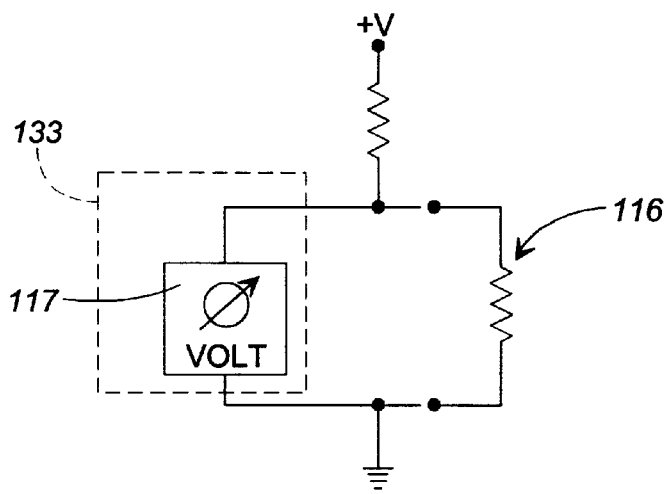
FIG. 7 is an electronic schematic diagram of a simple circuit for use with the embodiment of FIG. 6.
Figure 8:
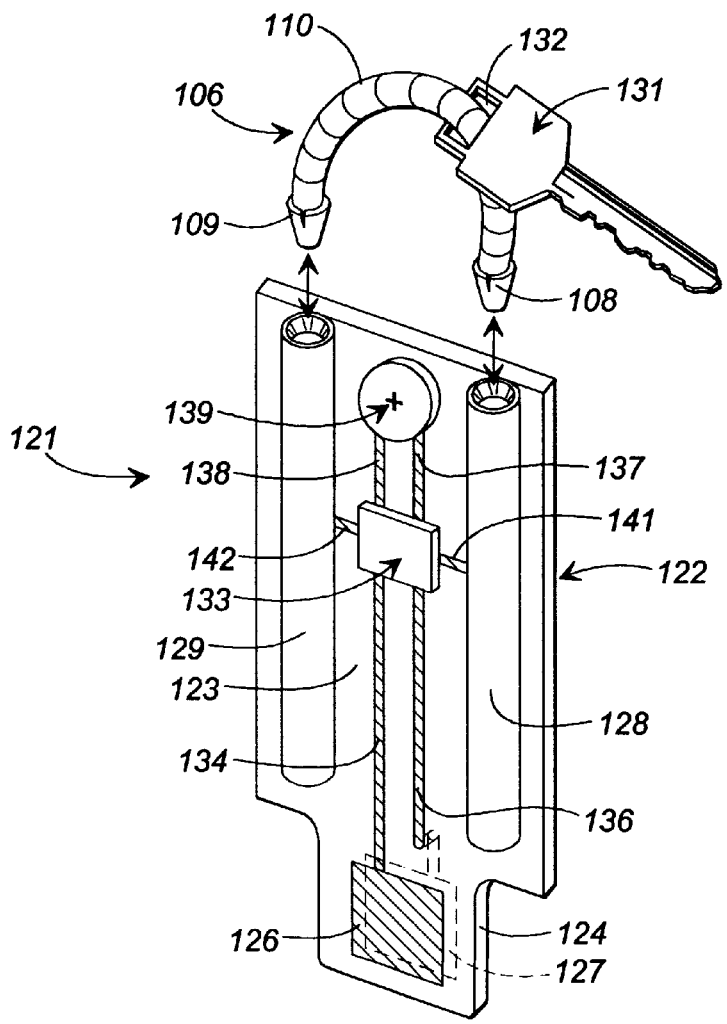
FIG. 8 is a perspective partially exploded illustration of a tamper detection and prevention apparatus that embodies principles of the invention in still another form.

FIGS. 6, 7, and 8 illustrate an alternate and more robust embodiment of the present invention. More specifically, the embodiments of FIGS. 1 through 5 suffer from the requirement that a human subsequently notice that a key or bag has been compromised and check the access logs to reveal the thief. In addition, the system, although more secure than the traditional Key Track system, still may be defeated by, for example, jumpering the conductive tether before it is cut and repairing the cut before removing the jumper. The embodiment of FIGS. 6, 7, and 8 addresses this vulnerability.

Referring to FIG. 8 first, a key tag assembly 121 comprises a key card 122, which preferably but not necessarily is formed of printed circuit board material. The key card 122 has a main body 123 and a depending tongue 124. A capacitive plate RF antenna is defined by a pair of capacitive plates 126 and 127 formed, preferably with printed circuit board etching techniques, on either side of the depending tongue 124. A spaced pair of tether retaining tubes 128 ad 129 are mounted to the main body 123 and each has an open end formed with an internally extending locking rim as described above. A tether 106 has spring loaded locking ends 108 and 109 respectively connected by a tether loop 110. As with prior embodiments, the tether is adapted to be extended through the opening 132 of a key 131 and its ends snapped into the open ends of the tether retaining tubes 128 and 129 to tether and secure the key 131 to the key card 122. A protective sheath (not shown in FIG. 8) may be provided as in prior embodiments to encase the card and protect the components thereof.

A tag circuit 133, which may include a micricontroller chip and other related electronics (FIG. 9) is mounted to the main body 123 of the key card 122 and is powered by an on board battery 139 connected to the microcontroller 133 via conductive traces 137 and 138 formed on the key card 122. The tag circuit 133 also is electrically connected to the tether retaining tubes 128 and 129, which preferably are made of electrically conductive material, via conductive traces 141 and 142. A pair of conductive traces 134 and 136 connect the microcontroller and tag circuit to contact plates 126 and 127 on the tongue of the key card 122. The microcontroller is programmed with an ID code that can be communicated to the main controller of a Key Track system through the contact plates. Radio frequency transmission through an antenna may also be used, as described in more detail above. Alternatively, a standard RF tag could be provided on the card and controlled by the microcontroller to transmit its code. The contacts shown in FIG. 8 as a preferred embodiment and is considered to be one best mode of carrying out the invention.

FIG. 6 illustrates the tether 106 of this embodiment in more detail. The tether 106 has spring loaded locking ends 108 and 109 connected by a tether loop 107. The tether loop 107 is formed with an internal strand of resistive material 111 surrounded by a dielectric insulator 112 and an outer protective casing 113, forming a coaxial structure. Thus, the tether, rather than being conductive as with prior embodiments, has a specific resistance determined by the resistivity of the resistive strand 111 and its length. When the tether is locked in place in the tether retaining tubes, this resistance is coupled to the microcontroller 133 as illustrated schematically in FIG. 7.

In general, the embodiment of FIGS. 6 through 8 functions to provide tamper detection as follows. A more detailed description is provided below. The battery 139 supplies operating power to the microcontroller, which is programmed to generate a small current through traces 141 and 142 and through the attached resistive tether 106. The microcontroller monitors the resulting voltage drop across the resistive tether through its digital-to-analog (D/A) converters. If this resistance changes, then it is likely that the tether has been cut, jumppered, or damaged in some way. Upon detection of a resistance change, the microcontroller/tag circuit generates a signal indicative of a suspected tampering and transmits this signal to the central Key Track controller through the contact plates, just at the ID code is transmitted under normal conditions. The central controller can then respond by issuing the appropriate alarms and notifying security personnel of a suspected tampering or attempt to defeat the system. Thus, detection of tampering in this embodiment is immediate and does not require that a human operator subsequently notice that the tether has been cut. Accordingly, this embodiment is more robust and reliable than some prior embodiments, although not as economical. Further, with on-board intelligence provided by the microcontroller, a record of tampering situations or other information can be stored directly on the key card, including the number of detected tamperings and their times.

Figure 9:
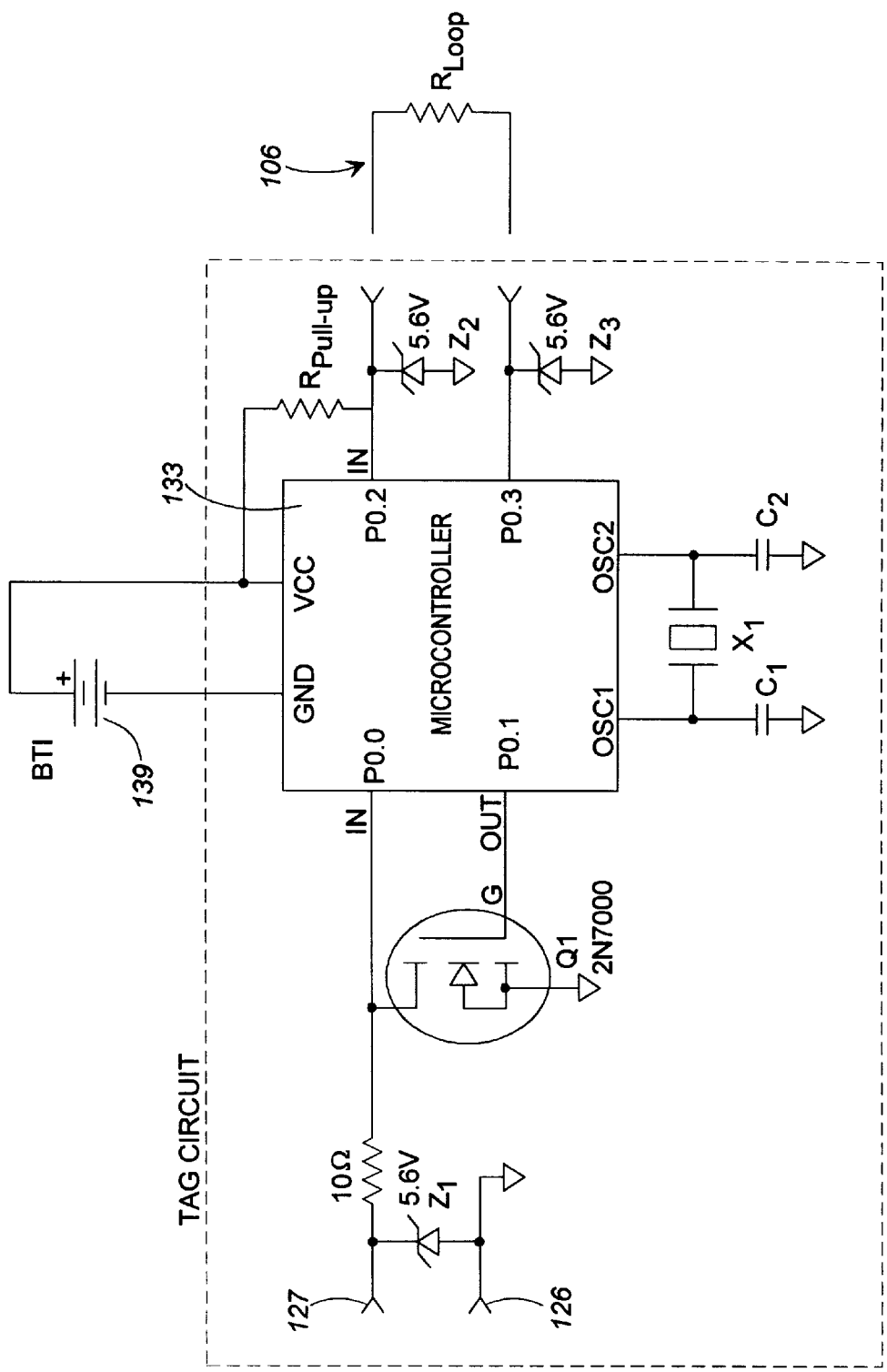
FIG. 9 is an electronic schematic diagram of a circuit usable to realize the embodiment of FIG. 8.

FIG. 9 is an electronic schematic of a preferred circuit for use in the embodiment shown in FIGS. 6 through 8. The microcontroller 133 is seen to be powered by the battery 139 and is connected through I/O ports P02 and P03 to the resistive tether 106. A crystal oscillator provides a clock signal for operation of the microcontroller and the capacitive plates 126 and 127 of the capacitive plate antenna are connected through an N-channel MOSFET inverting switch to I/O ports PO0 and PO1. As described above, the microcontroller is programmed to generate a small current through the resistive tether 106 and to monitor the resulting voltage drop across the tether for detecting a change in the resistance of the loop. Upon initial attachment of the tether to the key tag assembly, the microcontroller reads the voltage drop of the new tether and stores this value for future comparison in detecting changes in the resistance of the tether. Since each tether has a different resistance and since these resistances are unknown to a potential thief, jumpering the tether prior to cutting it in an attempt to defeat the system is virtually impossible. The very act of attaching the jumper creates a parallel resistance that lowers the apparent resistance of the tether. Accordingly, an attempt to jumper the tether is itself detected and results in an alarm. It will thus be seen that the resistive tether embodiment provides a significantly higher level of security than simpler conductive tether designs.

Figure 10:
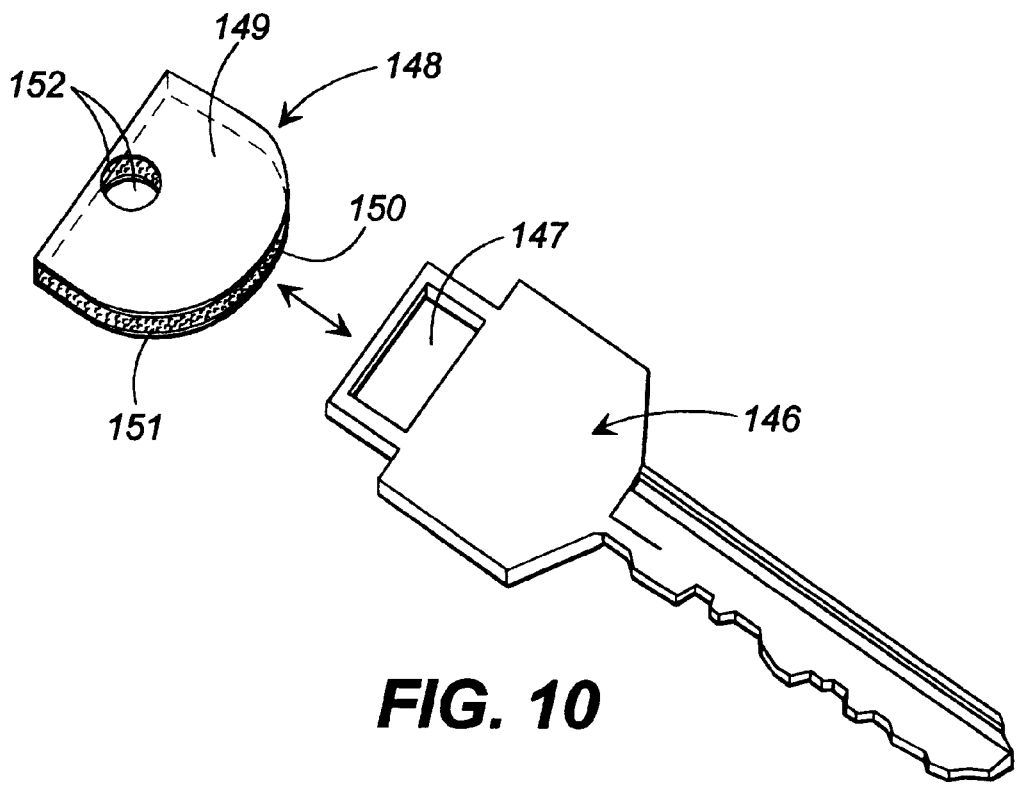
FIGS. 10 and 11 are perspective views illustrating a stainless or hardened steel shroud for prevent a key from being cut from its tether in a Key Track system.
Figure 11:
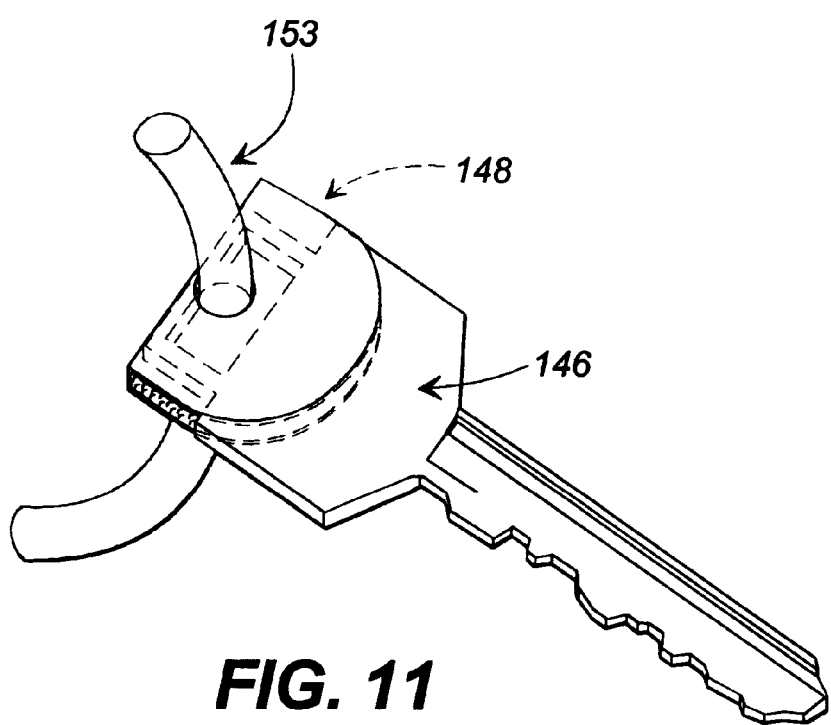

FIGS. 10 and 11 illustrate a security device usable with the enhanced key tag of this invention to address another vulnerability, the possibility that a thief will simply cut the key itself to remove it from its tether without damaging the tether. It is generally easy to cut keys in this way with a simple pair of wire cutters since keys inherently are made of soft metal to facilitate key manufacture and duplication. To prevent this eventuality, a generally U-shaped shroud 148 is formed of stainless steel or other hardened material and has a first side 149 and a second side 150. Rough inner surfaces 151 are formed on the sides of the shroud for gripping the key and aligned openings 152 are formed through the sides for receiving a tether 153 (FIG. 11). In use, the shroud 148 is slipped over the end of a key 146 covering the opening 147 thereof. A tether is then inserted through the openings in the shroud and through the key opening to attach the key to a key card as described above. The shroud thus protects the weakest parts of the key from easy access with wire cutters. The steel shroud is sized so that no axial spinning of the key inside the shroud can expose the weakest part of the key. Thus, it is difficult to cut the key off its tether and, even if the key is cut, may be unusable.

The invention has been described herein in terms of preferred embodiments. It will be understood, however, that other embodiments and techniques are possible and usable within the general scope of the invention. For example, the tethers have been described as being conductive or resistive. However, other envisioned tether technologies applicable to the invention include compressed gas/vacuum/fluid filled tethers, elastic trigger tethers, reflective wave tethers, and piezoresistive tethers. In a compressed gas type tether, the tether is tubular and is filled with a substance (gas/vacuum/fluid, etc.) that causes a pressure difference with the normal atmospheric pressure. This pressure differential is harnessed to apply a force to or release a force from an actuator such as a switch in the tether. The actuator, when in its normal condition, indicates that the tether loop is in a normal non tampered state. If the tether is cut, damaged, or otherwise tampered with in such a way as to breach the tether, the pressure in the tether normalizes to ambient pressure, releasing the actuator to indicate a tampered condition and this is conveyed to the central controller for action.

In an elastic trigger type tether, an elastic member is disposed and stretched within the tubular tether. The elastic member is attached at one end to an end of the tether and its other end is attached to a sensor such as a switch or optical interrupter. If the tether is cut to release the protected object (key, etc.) the elastic member relaxes and releases the sensor, indicating a tampered condition.

In a reflective wave type tether, the tether is configured to function as a waveguide (such as a coax line or an internal fiber optic cable). A wave is launched into the one end of the waveguide, which is terminated at its other end with a matching line impedance, and a monitoring system on the key tag samples for any reflected waves. As long as the tether is intact, the matched line impedance at the other end of the waveguide insures that no or only expected reflections will be generated. If the tether is cut, altered, damaged, or shorted, unexpected reflected waves in the guide are generated and such reflective waves are detected and signaled to the central controller to indicate a possible tampering condition.

A piezoresistive tether contains a piezoresistive element whose resistance changes with length or cross-sectional area. This phenomena can be utilized in a tether to sense compression and tension forces on the tether that may be early indicators of tampering. If the tether is cut, this is detected through the complete loss of continuity through the tether.

In addition to electronic detection of tampering or attempted removal on an object, simpler user level approaches are also envisioned. These approaches include, for example, filling a hollow tether with a highly identifiable and bright colored marking dye to mark a stolen key or other object and the person who took it if the tether is cut to remove the object. Other possibilities include filling the tether with a pungent odor producing material or with a material that would produce a sound when released to draw attention to a would be thief.

These and other additions, deletions, and modifications might well be made to the disclosed embodiments without departing from the spirit and scope of the invention as set forth in the claims.

What is claimed is:

1. An enhanced key tag assembly for use with a Key Track system, said key tag assembly comprising a key card, an ID code stored on said key card, means for communicating the ID code to a central controller of a Key Track system, a tether connecting a key to the key card, and means for detecting tampering with the tether as an indication of an attempt to remove the key from its card, said means for detecting tampering including a conductive tether and wherein the ID code is communicated to the central controller through said conductive tether, the communication link being broken if said tether is cut resulting in a cessation of signal communication to said central controller.

2. The key tag assembly of claim 1 and further including a shroud covering at least a portion of a key attached to the tether to protect the key from being cut and removed from said tether.

3. The key tag assembly of claim 1 and further comprising tether retaining means on said key card, said tether retaining means lockably receiving ends of said tether to attach said tether to said key card.

4. The key tag assembly of claim 1 an wherein said means for communicating comprises a touch memory device attached to said card.

5. The key tag assembly of claim 1 and wherein said means for communicating comprises an RF antenna on said card.

6. The key tag assembly of claim 5 and wherein said RF antenna comprises a capacitive plate antenna.

7. The key tag assembly of claim 5 and wherein said RF antenna comprises an inductive loop antenna.

* * * * *